(12) United States Patent
Schiller et al.

(10) Patent No.: US 7,934,195 B2
(45) Date of Patent: Apr. 26, 2011

(54) METHOD FOR CONTROLLING THE PROPAGATION OF METADATA ITEMS

(75) Inventors: Harald Schiller, Hannover (DE); Dirk Adolph, Ronnenberg (DE); Jobst Hörentrup, Hannover (DE); Wolfgang Klausberger, Hannover (DE); Axel Kochale, Springe (DE); Marco Winter, Hannover (DE)

(73) Assignee: Thomson Licensing, Boulogne, Billancourt (FR)

( * ) Notice: Subject to any disclaimer, the term of this patent is extended or adjusted under 35 U.S.C. 154(b) by 1254 days.

(21) Appl. No.: 10/453,035

(22) Filed: Jun. 3, 2003

(65) Prior Publication Data
US 2003/0225792 A1 Dec. 4, 2003

(30) Foreign Application Priority Data

Jun. 3, 2002 (EP) .................................. 02012190
Jul. 25, 2002 (EP) .................................. 02016630

(51) Int. Cl.
*G06F 9/44* (2006.01)
*G06F 7/04* (2006.01)
(52) U.S. Cl. ..................... 717/120; 717/104; 726/27
(58) Field of Classification Search .............. None
See application file for complete search history.

(56) References Cited

U.S. PATENT DOCUMENTS

| | | | |
|---|---|---|---|
| 5,610,893 A | 3/1997 | Soga et al. | |
| 5,878,282 A | 3/1999 | Mital | |
| 6,240,416 B1 | 5/2001 | Immon et al. | |
| 6,493,720 B1 | 12/2002 | Chu et al. | |
| 6,681,323 B1 * | 1/2004 | Fontanesi et al. | 713/1 |
| 6,732,124 B1 | 5/2004 | Koseki et al. | |
| 6,882,618 B1 | 4/2005 | Sakoda et al. | |
| 7,191,190 B2 * | 3/2007 | Debique et al. | 707/104.1 |
| 7,310,821 B2 * | 12/2007 | Lee et al. | 726/27 |
| 7,448,022 B1 * | 11/2008 | Ram et al. | 717/120 |
| 2001/0011308 A1 | 8/2001 | Clark et al. | 710/20 |
| 2003/0028870 A1 * | 2/2003 | Weisman et al. | 717/178 |
| 2003/0105718 A1 * | 6/2003 | Hurtado et al. | 705/51 |
| 2004/0015822 A1 * | 1/2004 | Linton et al. | 717/104 |
| 2004/0181775 A1 * | 9/2004 | Anonsen et al. | 717/104 |
| 2007/0234290 A1 * | 10/2007 | Ronen et al. | 717/120 |
| 2009/0199302 A1 * | 8/2009 | So et al. | 726/27 |

(Continued)

FOREIGN PATENT DOCUMENTS

EP   0 481 508   4/1992

(Continued)

OTHER PUBLICATIONS

"How important is metadata?", Lagoze et al., Jul. 2002, p. 369, <http://delivery.acm.org/10.1145/550000/544315/p369-lagoze.pdf>.*

(Continued)

*Primary Examiner* — Thuy Dao
(74) *Attorney, Agent, or Firm* — Robert D. Shedd; Joseph J. Opalach

(57) ABSTRACT

A method enables and controls automatic propagation of metadata items to a recording media or to devices for reading from or writing to recording media. The metadata items are provided with a propagation property, which defines to which recording media or to which devices the metadata items shall propagate, and on which recording media or in which devices the metadata items shall be stored. At least when a recording medium is inserted into or removed from a device, or when the device is powered up or down, the metadata items are automatically propagated and stored in accordance with the propagation property.

14 Claims, 2 Drawing Sheets

U.S. PATENT DOCUMENTS

2010/0058485 A1 * 3/2010 Gonzalez .................. 726/27

FOREIGN PATENT DOCUMENTS

| JP | 60215262 A | 10/1985 |
| JP | 63071721 A | 4/1988 |
| JP | 07-325671 A | 12/1995 |
| JP | 07326166 A | 12/1995 |
| JP | 10156043 A | 6/1998 |
| JP | 2000-99487 | 4/2000 |
| JP | 2000-183916 | 6/2000 |
| JP | 2000-284995 | 10/2000 |
| JP | 2000-293458 | 10/2000 |
| JP | 2001-77789 | 3/2001 |
| JP | 2001318832 A | 11/2001 |
| JP | 2002-77134 | 3/2002 |
| WO | WO 01/33435 | 5/2001 |

OTHER PUBLICATIONS

"Relationship among copyright holders for use and reuse of digital contents", Kumazawa et al., Jun. 2000, pp. 254-255, <http://delivery.acm.org/10.1145/340000/336688/p254-kumazawa.pdf>.*

"Administering propagated metadata in large, multi-layer database systems", Rosenthal et al., 1999, pp. 1-6, <http://ieeexplore.ieee.org/stamp/stamp.jsp?tp=&arnumber=836524>.*

* cited by examiner

METHOD FOR CONTROLLING THE PROPAGATION OF METADATA ITEMS

FIELD OF THE INVENTION

The present invention relates to a method for controlling the propagation of metadata items to recording media and/or to devices for reading from and/or writing to recording media, and to a device and a recording medium for performing the method.

BACKGROUND OF THE INVENTION

The future of home entertainment will be characterised by two important developments. The first development is that an increasing amount of metadata items will be available. The metadata items will contain all kind of additional data related to multimedia objects, recording media and consumer electronic devices. The second development is that consumer electronic devices will increasingly be connected to networks allowing for communication and data exchange between the devices.

When dealing with metadata items in an environment of removable recording media and consumer electronic devices connected to a network, an important aspect is how the metadata items shall propagate between the involved devices and/or recording media. Known metadata schemes make no assumptions about metadata propagation. Their approach with respect to propagation of metadata is completely static. Any propagation of metadata items must be explicitly initiated by the user. However, it would be very efficient and user friendly if certain metadata items could be automatically propagated in a controlled way. A straightforward solution for this purpose is not available, since a propagation behaviour appropriate for one kind of metadata item might be inappropriate for a different kind of metadata item.

It is, therefore, an object of the present invention to propose a method for enabling and controlling automatic propagation of metadata items to recording media and to devices for reading from and/or writing to recording media.

SUMMARY OF THE INVENTION

A method according to a first aspect of the invention comprises the steps of:

providing metadata items with a propagation property, the propagation property defining to which recording media and/or to which devices the metadata items shall propagate, and on which recording media and/or in which devices the metadata items shall be stored, and automatically propagating and storing the metadata items in accordance with the propagation property at least when a recording medium is inserted into or removed from a device, or when the device is powered up or down. Though the terms "inserted into" and "removed from" are used throughout the description, the invention is applicable to any form of contact between the recording medium and the device, which allows for data exchange, including contactless techniques. By adding a propagation property to each metadata item, any given metadata scheme can be augmented to allow for automatic metadata propagation. The propagation property can, for example, be embodied as a flag vector of predetermined dimension. The automatic propagation and storage of the metadata items when a recording medium is inserted into a device, or when the device is powered up, guarantees that both, device and recording medium, are provided with all necessary metadata items before any further action is initiated. Automatically propagating the metadata items when the recording medium is removed from the device, or when the device is powered down, makes sure that the recording medium and the device are provided with the most recent metadata items, i.e. that no changes, which might have been made to the metadata items, are lost. In a more general approach, metadata items are automatically propagated when a transition occurs from one "device state" to another "device state", e.g. from "off" to "on" or from "recording medium loaded" to "no recording medium loaded" etc. Besides the above mentioned device states many other device states can be used.

Advantageously, the propagation property assumes one or more of a plurality of predefined values. In this way different schemes for propagating metadata items can be realised. For each metadata scheme a set of allowable values for the propagation property, the so-called "storage states", must be defined. In addition, it must be specified, which metadata items shall be copied to which locations and when. This is preferably done by defining a set of rules, each rule being associated to a certain combination of one or more of the above storage states and one or more of the above device states. The rules specify what shall be performed on a metadata item with a certain storage state in case a certain device state has been reached.

Possible values for the propagation property include:
global
recording medium only
all recording media
device only
all devices
temporary.

A "global" metadata item is meant to propagate to any accessible storage location, i.e. from a recording medium to all devices the recording medium ever gets inserted into, or from a device to all recording media ever inserted there.

A "recording medium only" metadata item is meant to be confined to the recording medium it resides on, except for an eventual temporary storage in a device. As soon as the recording medium is removed from the device, the copy of the metadata item temporarily stored in the device has to be removed as well.

An "all devices" metadata item is similar to a "recording medium only" metadata item, with the difference that the metadata item will propagate to any device the recording medium ever is inserted into, and it will remain stored in the device even after removal of the recording medium. However, it will never propagate from any of these devices back to any other recording medium.

A "device only" metadata item is meant to never leave a device, but to remain in the device even if the device is powered down. A device only metadata item will never exist on any recording medium.

An "all recording media" metadata item behaves similar to a "device only" metadata item, with the difference that the metadata item will propagate to any recording medium ever inserted into the device. However, the metadata item will never propagate from any of these recording media back to any other device, except for temporary storage.

A "temporary" metadata item can only exist in a device, which it will never leave. Temporary metadata items will cease to exist after power down of the device. They can, for example, be useful during manipulations of metadata items.

Although the above defined values for the propagation property are sufficient for a controlled propagation of metadata items, further values can, of course, be used.

A method according to a second aspect of the invention comprises the steps of:

providing the metadata items with a propagation property, the propagation property assuming a first or a second value, automatically propagating copies of those metadata items which have the first propagation property value from a device to a recording medium, and vice versa, if and only if they do not yet exist in the respective other location, at least when the recording medium is inserted into or removed from the device, or when the device is powered up or down. By using only two propagation property values a transparent propagation scheme is achieved. A metadata item will either propagate or not, no further distinction is necessary to which devices or recording media the metadata item shall propagate. The first and second propagation property value will henceforth be designated as "active" and "passive", respectively. The propagation property can, for example, be embodied as a flag. By restricting the automatic propagation to only those metadata items which are not yet identically existent in the respective other location, it is guaranteed that the process of propagation will not supersede any existing propagation property. Whether or not an identical metadata item exists can be ascertained, for example, by comparing unique identifiers associated with the metadata items.

The method has the advantage that it becomes easy for a device to visualize and for a user to understand the effect the different propagation properties have on the permanent and non-permanent storage of metadata items on the recording media and in the devices.

Advantageously, the method further comprises the step of changing the propagation property of the propagated copies of the metadata items to the second propagation property value. By changing the propagation property to "passive" the process of propagation is not recursive and will stop after one duplication step. No further provisions are necessary to prevent unwanted spreading of a metadata item. A copy of an "active" metadata item will always be "passive".

Favourably, the methods according to the invention further comprise the step of temporarily storing into a first memory of the device for reading from and/or writing to recording media all metadata items accessible in a second memory of the device or reduced versions of these metadata items when the device is powered up and all metadata items accessible on a recording medium or reduced versions of these metadata items whenever such recording medium is inserted into the device. In this way, during operation, all accessible metadata items are stored in the first memory. The first memory, therefore, always contains the totality of metadata items from the device and from all recording media inserted therein. The first memory actually emulates all inserted recording media and the second memory. This enables an easy manipulation, handling and re-classification of metadata items. Favourably, the first and the second memory are a volatile memory and a permanent memory, respectively. However, the first memory can also be realized as a permanent memory. Typically, metadata items stored in a volatile memory are accessible much faster than those stored in a permanent memory. If only reduced versions of the metadata items are stored in the volatile memory, they can be quickly accessed, whereas any access to those parts of a metadata item which is not contained in the reduced version necessitates an additional and potentially slower access to the full-size metadata item retained in the permanent memory. By appropriately specifying which parts of a metadata item shall be contained in the reduced version, the compromise between access speed and memory usage can be optimized for any given application. For example, information like "creation date", "author", "last access", etc. does not necessarily need to be stored in the volatile memory. In the following, any mentioning of "metadata item" shall always be understood to include the cases of reduced version of a metadata item as well as full-size metadata item.

According to a further advantageous refinement of the invention, the methods further comprise the step of retrieving additional metadata items from a network and at least temporally storing these metadata items in the device. In this way further helpful metadata items can be obtained from other devices of the network. The term "network" denotes any number of devices which are connected in a way that enables data exchange between the devices, including fixed wire and wireless connections.

Advantageously, the methods further comprise the step of adding a location identifier to the metadata items upon storage, the location identifier indicating to which storage location the propagation property of a metadata item applies. Considering the method according to the first aspect of the invention, the "recording medium only" metadata items and the "all devices" metadata items stored in the first memory must consistently be written back to the recording medium they came from. Furthermore, for "all recording media" metadata items it is necessary to distinguish between those that are resident in the device (and will persist there and be written to any inserted recording medium), and those which are temporarily stored in the first memory because they have been found on one of the inserted recording media, to which they have been previously written by a different device. In a device capable of holding a plurality of recording media, it is critical for a consistent write back to know from which of the inserted recording media each metadata item came.

Considering the method according to the second aspect of the invention, in the first memory of the device several copies of a metadata item can exist coming from different locations and having different propagation properties. For example, an "active" metadata item from a first recording medium will be copied as a "passive" metadata item to the first memory of the device, i.e. having a propagation property "passive" and a location identifier "device". In addition, a further copy of the same metadata item will exist in the first memory having a propagation property "active" and a location identifier "medium 1". Other copies coming from further recording media might also be present. The metadata items stored in the first memory coming from different recording media must consistently be written back to the recording media they came from. At the same time the correct propagation property has to be preserved. By adding a location identifier to the metadata items upon storage, all of the above problems are easily solved.

Favourably, the methods according to the invention further comprise the step of modifying the propagation properties of stored metadata items. This modifying of propagation properties can either be performed automatically or by user intervention. In this way further possibilities for managing the propagation behaviour of metadata items are provided.

According to the invention, the methods further comprise the steps of writing back the metadata items in accordance with the propagation property and the location identifier from the first memory of the device to a recording medium at least when the recording medium is removed from the device, or from the first memory of the device into the second memory of the device at least when the device is powered down. When the above mentioned reduced versions of metadata items are being handled in memory, this writing back must be understood to encompass a step of referencing and outputting the full-size metadata items such that no parts of metadata items get lost when leaving the system. The step of writing back ensures that all metadata items are written to the location indicated by their propagation property, and that both, the recording medium and the device, are provided with the most recent metadata items in case changes have been made to the metadata items.

According to a further advantageous refinement of the invention, the methods further comprise the step of sending metadata items stored in the device to a network. This allows to provide helpful metadata items to other devices in the network.

Favourably, the steps of writing metadata items back to the recording medium, of moving metadata items to the second memory, and/or of sending metadata items to the network comprise overwriting of the metadata items existing on the recording medium, in the second memory, and/or in the network. This ensures that outside the first memory every metadata item has a definite propagation property, which would not be the case if metadata items were merged. Only inside the first memory of the device the same metadata items, i.e. metadata items having an identical metadata body, may exist with different values for the propagation property. Therefore, the data structure of the metadata items must permit to hold more than one propagation property.

Advantageously, the methods according to the invention further comprise the step of providing at least some of the metadata items with an expiration property for limiting the propagation of the metadata items. This expiration property can, for example, be a time limit, a limit in the number of propagation steps or any other property, which might inhibit or otherwise limit propagation. Such an expiration property becomes especially important in case of a "global" metadata item, which could otherwise develop a "virus-like" nature.

Favourably, the methods further comprise the step of providing the recording medium and/or the device for reading from and/or writing to recording media with a protection property for preventing the propagation and/or alteration of metadata items. The propagation property is meant to be superseded by the protection property, i.e. any act of copying as demanded by the propagation property will be performed only as far as the protection property of the involved recording media, devices, and/or metadata items allows. This enables, for example, prevention of an undesired propagation of metadata items.

Advantageously, the protection property either provides for a protection against export, against import, or against both export and import of the metadata items from/to the recording medium and/or the device for reading from and/or writing to recording media. In this way a user can decide and easily put into effect whether a device or a recording medium shall be protected from propagating metadata items to other recording media and/or devices, or from receiving metadata items from other recording media or devices, or both.

According to the invention, a device for reading from and/or writing to recording media comprises means for performing a method according to the invention. Such a device provides a user with a very efficient and user-friendly way of controlling metadata propagation.

Favourably, a recording medium comprises metadata items having a propagation property for performing a method according to the invention. Such a recording medium optimally supports the inventive method.

Advantageously, a data stream comprises metadata items having a propagation property for performing a method according to the invention. This data stream, for example, is optimally suitable for a network comprising a device according to the invention.

BRIEF DESCRIPTION OF THE DRAWINGS

For a better understanding of the invention, exemplary embodiments are specified in the following description of advantageous configurations with reference to the figures. It is understood that the invention is not limited to these exemplary embodiments and that specified features can also expediently be combined and/or modified without departing from the scope of the present invention. In the figures.

DETAILED DESCRIPTION OF PREFERRED EMBODIMENTS

Figure 1:
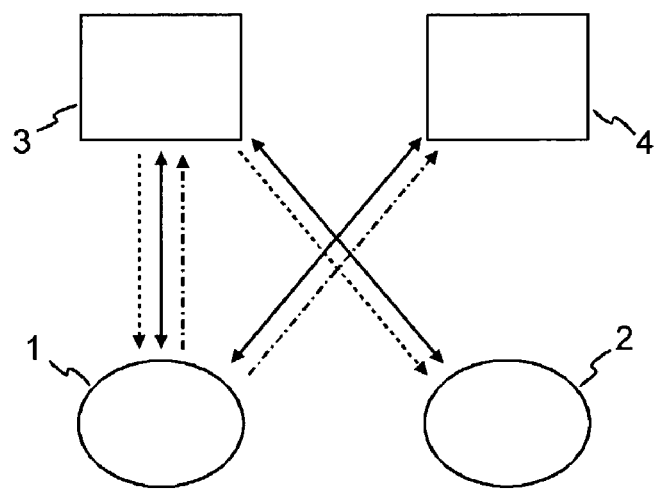
FIG. 1 shows a metadata propagation scheme according to the first aspect of the invention.

FIG. 1 shows a metadata propagation scheme according to the present invention. Depicted is the propagation of metadata items between a first recording medium 1 and a first and a second device 3,4 for reading from and/or writing to recording media, and between the first device 3 and a second recording medium 2. The figure is limited to "global" (solid arrow), "all recording media" (short dashed arrow) and "all devices" (dash dotted arrow) metadata items, since in the case of "recording medium only" and "device only" metadata items no actual propagation occurs between the devices 3, 4 and the recording media 1, 2. A "global" metadata item can reside either on a recording medium 1, 2 or on a device 3, 4 for reading from and/or writing to recording media. In case it resides on a recording medium 1, 2, it will propagate to any device 3, 4 the recording medium 1, 2 is inserted into. The metadata item will then propagate from the device 3, 4 to any future recording medium 1, 2 inserted therein. In case the "global" metadata item resides in either device 3, 4, it will first propagate to a recording medium 1, 2 inserted therein, and will continue to propagate from the recording medium 1, 2 to any further device 3, 4 the recording medium 1, 2 is inserted into.

An "all recording media" metadata item can only propagate from a device 3, 4 for reading from and/or writing to recording media to a recording medium 1, 2 inserted therein. It is stored on the recording medium 1, 2, but contrary to a "global" metadata item it will not continue to propagate from the recording medium 1, 2 to other devices 3, 4.

An "all devices" metadata item can only propagate from a recording medium 1, 2 to a device 3, 4 for reading from and/or writing to recording media. It will be stored in any device 3, 4 the recording medium 1, 2 is inserted into, but it will not propagate from the device 3, 4 to any other recording medium 1, 2.

Figure 2:
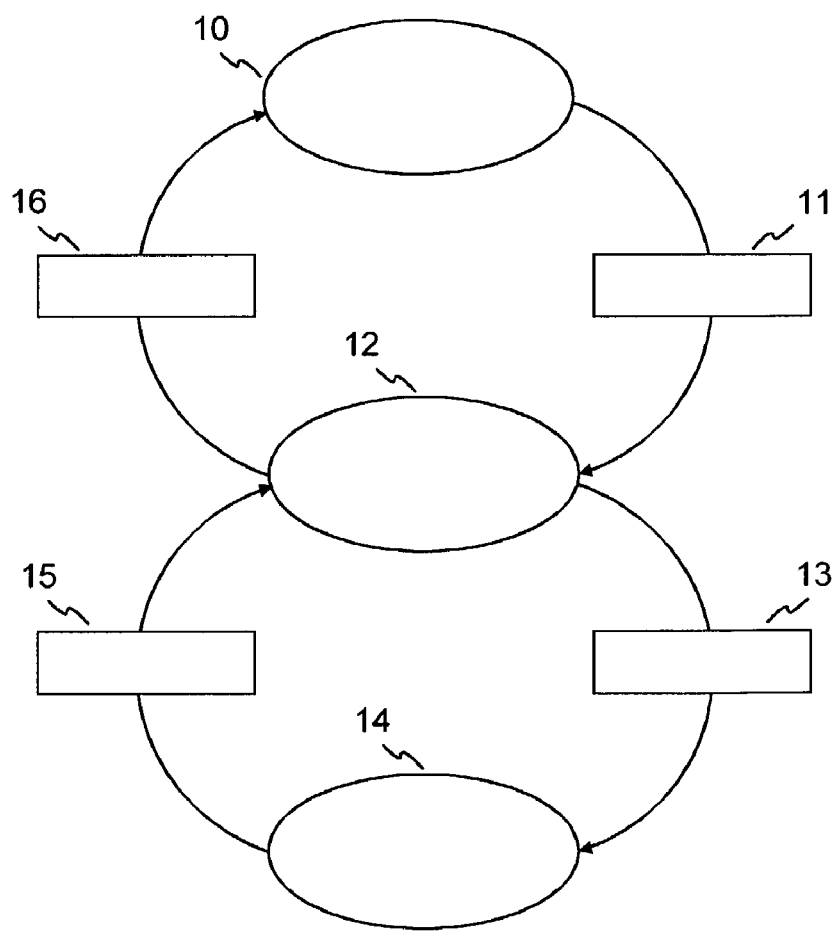
FIG. 2 shows a scheme of device state transitions.

FIG. 2 shows the propagation of metadata items using a scheme of device state transitions. Depicted are three main states: A first state "power off" 10, a second state "power on, no recording medium recognized" 12, and a third state "power on, recording medium recognized" 14. It is assumed that the transition to the "power off" state 10 is always through the "power on, no recording medium recognized" state 12. The transition from the first state 10 to the second state 12 is through a "power up" step 11. Correspondingly, the transition between the second state 12 and the first state 10 is through a "power down" step 16.

A state transition from the second state 12 to the third state 14 occurs through a "recording medium welcome" step 13. The step 13 comprises at least two cases:

recognition of a recording medium after it is inserted into the device or into one of a plurality of ports of the device; and recognition of a recording medium, physically already present in the device, after power up.

Correspondingly, the transition between the third state 14 and the second state 12 occurs through a "recording medium farewell" step 15. As before, also the "recording medium farewell" step 15 comprises at least two cases:

farewell of a recording medium prior to imminent removal of the recording medium from the device; and farewell of a recording medium, which physically remains in the device, prior to imminent power down.

Figure 3:
FIG. 3 shows a metadata item according to the invention.

FIG. 3 shows a metadata item 5 according to the invention as present on a recording medium 1, 2 or in the permanent memory 31, 41 of a device 3, 4 for reading from and/or writing to recording media. The metadata item 5 comprises a propagation property 6 and a protection property 7, but no location identifier. It is, of course, also possible to include a location identifier if needed.

Figure 4:
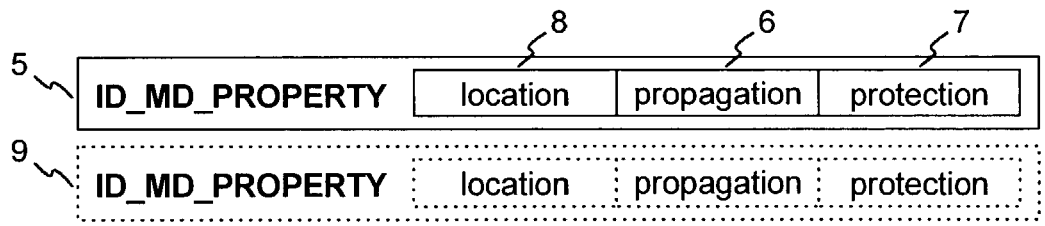
FIG. 4 shows a metadata item inside a volatile memory having more than one propagation property.

FIG. 4 shows a metadata item 5 according to the invention as present in the volatile memory 32, 42 of a device 3, 4 for reading from and/or writing to recording media. Besides the propagation property 6 and the protection property 7, the metadata item 5 further comprises a location identifier 8. This allows to store several copies 5, 9 of the same metadata item, having different propagation properties 6 and location identifiers 8, together in the same volatile memory 32, 42. This can, for example, be realized by storing a single metadata item 5 with a table of propagation properties 6 and the respective location identifiers 8, or by storing individual metadata items 5, 9 each having a single propagation property 6 and location identifier 8. The first solution, however, is preferable, since changes to the content of a metadata item 5 need only be made once.

Figure 5:
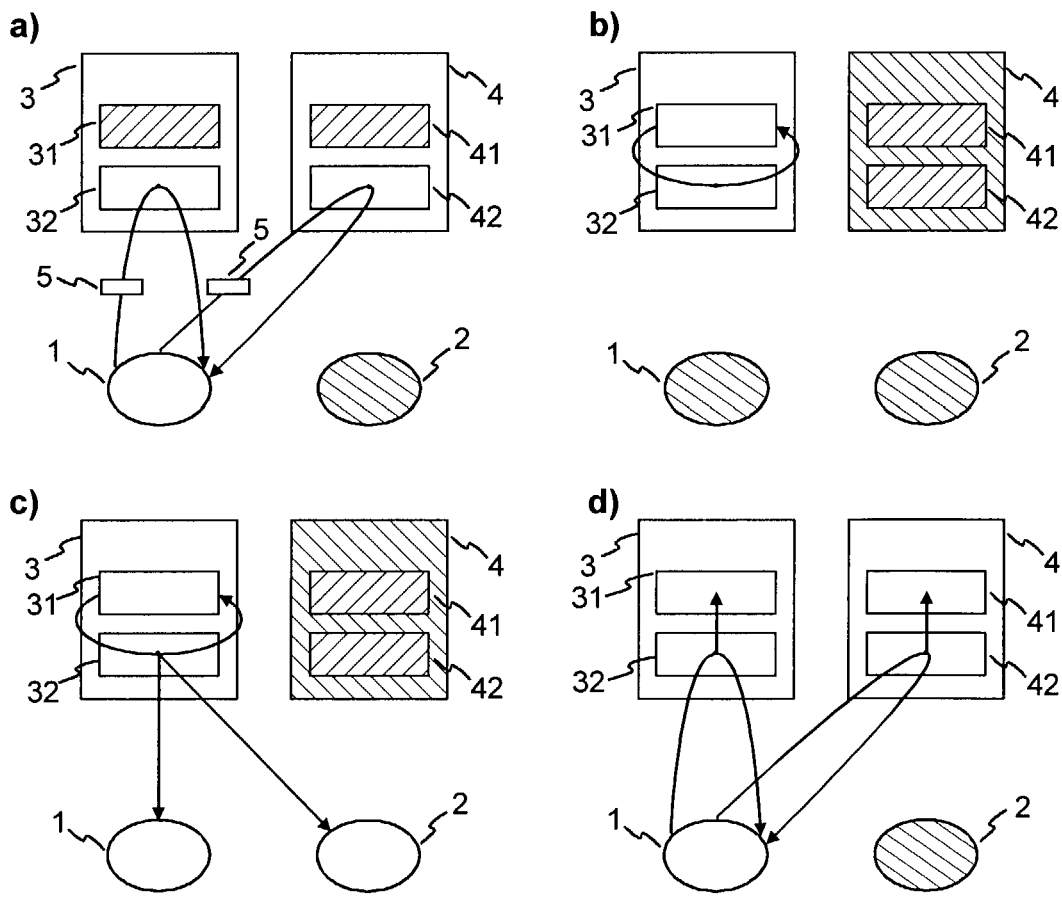
FIG. 5 shows a propagation scheme for metadata items having different propagation properties using a volatile memory.

FIG. 5 shows a propagation scheme for metadata items 5 having different propagation properties using a volatile memory. Depicted are similar to FIG. 1 a first and a second recording medium 1, 2 and a first and a second device 3, 4 for reading from and/or writing to recording media, each device 3, 4 comprising a permanent memory 31, 41 and a volatile memory 32, 42. Inactive parts of the devices 3, 4 and inactive recording media 1, 2 are hatched, inactive meaning that they do not take part in metadata propagation. While in FIG. 5a) also a metadata item 5 is shown, it has been omitted in FIG. 5b)-5d) for the sake of clarity.

First, FIG. 5 shall be explained for metadata items having propagation properties according to the first aspect of the invention.

In FIG. 5a), the handling of a "recording medium only" metadata item 5 resident on the first recording medium 1 is shown. When the recording medium 1 is inserted into the device 3, 4, the "recording medium only" metadata item 5 is copied to the volatile device memory 32, 42. Upon a "recording medium farewell" device state transition the copy of the "recording medium only" metadata item 5 is written back to the recording medium 1 and removed from the volatile memory 32, 42. In the device 3, 4 no copy of the metadata item 5 remains, therefore the "recording medium only" metadata item 5 cannot propagate to the second recording medium 2 either.

FIG. 5b) depicts the handling of a "device only" metadata item resident in the permanent memory 31 of the first device 3. Upon a "power up" state transition 11 the "device only" metadata item is copied from the permanent memory 31 to the volatile memory 32. Upon a "power down" state transition the metadata item is written back to the permanent memory 31 and removed from the volatile memory 32. No copy of the "device only" metadata item leaves the device 3, i.e. no copy is written to the recording medium 1, 2.

FIG. 5c) shows the handling of an "all recording media" metadata item resident in the permanent memory 31 of the first device 3. Upon a "power up" state transition, a copy of the metadata item is written to the volatile memory 32. Upon a "recording medium farewell" state transition an additional copy of the "all recording media metadata item" in the volatile memory 32 is written to the recording medium 1, 2. Upon a "power down" state transition, the copy of the metadata item in the volatile memory 32 is removed and written back to the permanent memory 31. The copy of the "all recording media" metadata item on the recording medium 1, 2 does not propagate to any other device the recording medium 1, 2 is inserted into.

The handling of an "all devices" metadata item resident on the first recording medium 1 is shown in FIG. 5d). Upon a "recording medium welcome" state transition a copy of the "all devices" metadata item is written to the volatile memory 32, 42. When a "recording medium farewell" state transition occurs, the copy of the metadata item in the volatile device memory 32, 42 is written back to the recording medium 1. When a "power down" state transition occurs, the copy of the "all devices" metadata item is written to the permanent memory 31, 41 and removed from the volatile memory 32, 42. The "all devices" metadata item does not propagate to any other recording medium.

FIG. 5 shall now be explained for metadata items according to the second aspect of the invention, i.e. metadata items being either "active" or "passive".

In FIG. 5a), the handling of a "passive" metadata item 5 resident on the first recording medium 1 is shown. When the recording medium 1 is inserted into the device 3, 4, it is determined whether the metadata item 5 already exists in the volatile device memory 32, 42. If this is not the case, the "passive" metadata item 5 is copied as a "passive" copy to the volatile device memory 32, 42 with a location identifier "medium 1". Upon a "recording medium farewell" device state transition 15 the copy of the "passive" metadata item 5 is written back to the recording medium 1 and removed from the volatile memory 32, 42. In the device 3, 4 no copy of the metadata item remains, therefore the "passive" metadata item 5 cannot propagate to the second recording medium 2 either.

FIG. 5b) depicts the handling of a "passive" metadata item resident in the permanent memory 31 of the first device 3. Upon a "power up" state transition 11 the "passive" metadata item is copied as a "passive" copy from the permanent memory 31 to the volatile memory 32 with a location identifier "device 1". Upon a "power down" state transition 16 the metadata item is written back to the permanent memory 31 and removed from the volatile memory 32. No copy of the "passive" metadata item leaves the device 3, i.e. no copy is written to the recording medium 1, 2.

FIG. 5c) shows the handling of an "active" metadata item resident in the permanent memory 31 of the first device 3. Upon a "power up" state transition 11, an "active" copy of the metadata item is written to the volatile memory 32 with a location identifier "device 1". At the same time, a "passive" copy of the metadata item is written to any recording medium 1, 2 present in the device in case the metadata item does not yet exist on the specific recording medium 1, 2. Corresponding "passive" copies are written to the volatile device memory 32 with the respective location identifiers. Upon a "recording medium farewell" state transition 15 the respective copy of the "passive" metadata item in the volatile memory 32 is written back to the recording medium 1, 2 and removed from the volatile memory 32. Upon a "power down" state transition 16, the "active" copy of the metadata item in the volatile memory 32 is removed and written back to the permanent memory 31. The "passive" copy of the metadata item on the recording medium 1, 2 does not propagate to any other device the recording medium 1, 2 is inserted into.

The handling of an "active" metadata item resident on the first recording medium 1 is shown in FIG. 5d). The propagation scheme will be explained with reference to the first device 3 only. The scheme for the second device 4 is identical. Upon a "recording medium welcome" state transition 13 a "passive" copy of the metadata item is written to the volatile memory 32 with a location identifier "device 1" in case the metadata item does not yet exist in the device 3. At the same time an "active" copy of the metadata item with a location identifier "medium 1" is also written to the volatile memory 32. When a "recording medium farewell" state transition 15 occurs, the "active" copy of the metadata item in the volatile device memory 32 with the location identifier "medium 1" is written back to the recording medium 1 and removed from the volatile memory 32. When a "power down" state transition 16 occurs, the "passive" copy of the metadata item with the location identifier "device 1" is written to the permanent memory 31 and removed from the volatile memory 32. The "passive" copy of the metadata item does not propagate to any other recording medium 2.

Writing the copies of the metadata items back to their respective source locations ensures that all changes made to the metadata items inside the volatile device memories 32, 42 are preserved.

What is claimed is:

1. Method for controlling the distribution of metadata items to recording media and to devices for reading from and/or writing to recording media, wherein it comprises the steps of:
    adding a respective propagation property to individual metadata items, the respective propagation property defining to which recording media and to which devices the metadata items must propagate and on which recording media and in which devices the metadata items must be stored together with the respective propagation property, the respective propagation property having one of at least two predefined values, wherein a first value indicates that a metadata item must be propagated and wherein a second value indicates that a metadata item must not be propagated,
    retrieving the respective propagation properties from the individual metadata items at least when a recording medium is inserted into or removed from a device or when the device is powered up or down, and
    responsive to the retrieved respective propagation properties, propagating and storing those metadata items, whose respective propagation properties indicate that those metadata items must be propagated, together with their respective propagation properties in accordance with their respective propagation properties,
    wherein propagating and storing of the metadata items together with their respective propagation properties is forced by the respective propagation properties.

2. Method according to claim 1, wherein copies of such metadata items, which have the first propagation property value, are automatically propagated from a device to a recording medium and vice versa, if and only if they do not yet exist in a respective other location.

3. Method according to claim 2, further comprising the step of
    changing the respective propagation property of the propagated copies of the metadata items to the second propagation property value.

4. Method according to claim 1, further comprising the step of
    temporarily storing into a first memory of the device for reading from and/or writing to recording media all metadata items accessible in a second memory of the device or reduced versions of these metadata items at least when the device is powered up and all metadata items accessible on a recording medium at least whenever such recording medium is inserted into the device.

5. Method according to claim 4, further comprising the step of
    adding a location identifier to the metadata items or reduced versions thereof upon storage, the location identifier indicating to which storage location the respective propagation property of a metadata item or of a reduced version thereof applies.

6. Method according to claim 5, further comprising the steps of
    writing back the metadata items, in accordance with the respective propagation property and the location identifier, from the first memory of the device to a recording medium at least when the recording medium is removed from the device, and/or
    moving the metadata items from the first memory of the device into the second memory of the device in accordance with the respective propagation property and the location identifier at least when the device is powered down.

7. Method according to claim 6, further comprising the step of
    sending metadata items stored in the device to a network.

8. Method according to claim 7, wherein the step of sending metadata items to the network comprise overwriting of the metadata items existing in the network.

9. Method according to claim 4, further comprising the step of
    changing the respective propagation properties of stored metadata items.

10. Method according to claim 6, wherein the step of writing the metadata items back to the recording medium and/or the step of moving the metadata items to the second memory comprise overwriting of the metadata items existing on the recording medium and/or in the second memory.

11. Method according to claim 1, further comprising the step of
    retrieving additional metadata items from a network and at least temporally storing the additional metadata items or reduced versions thereof in the device.

12. Method according to claim 1, further comprising the step of
    providing the metadata items with a respective expiration property for limiting the propagation of the metadata items.

13. Method according to claim 1, further comprising the step of
    providing the recording medium, the device for reading from and/or writing to recording media, and/or the metadata items or the reduced versions thereof with respective protection properties for preventing the propagation and/or alteration of metadata items.

14. Method according to claim 13, wherein the respective protection properties provide for either a protection against export, against import, or against both export and import of the metadata items or of reduced versions thereof from/to the recording medium and/or the device for reading from and/or writing to recording media.

* * * * *